Oct. 14, 1952     W. J. CAMPBELL     2,613,763
COASTER BRAKE FOR VELOCIPEDES
Filed April 29, 1948
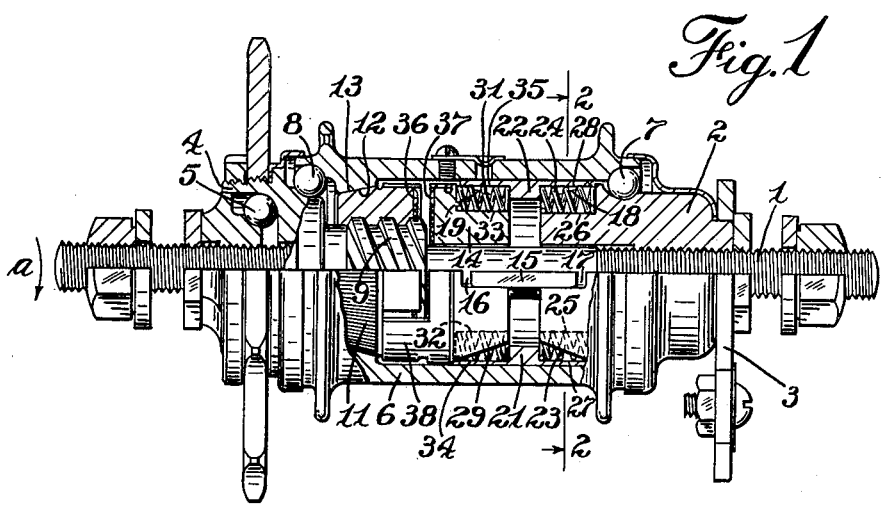
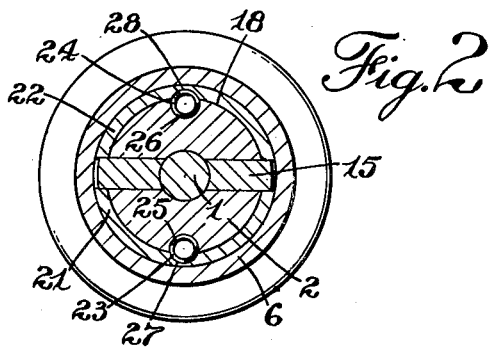
INVENTOR.
William J. Campbell
BY
Clinton S. Janes
ATTORNEY
WITNESS:
Esther M. Stockton Patented Oct. 14, 1952

2,613,763

UNITED STATES PATENT OFFICE 2,613,763

COASTER BRAKE FOR VELOCIPEDES

William J. Campbell, Elmira Heights, N. Y., assignor to Bendix Aviation Corporation, a corporation of Delaware Application April 29, 1948, Serial No. 23,890

1 Claim. (Cl. 188—26)

The present invention relates to a coaster brake for velocipedes and more particularly to an expanding shoe type of brake incorporating means to prevent the brake shoes from sticking or jamming.

In that type of brake incorporating cylindrical brake shoes which are actuated by conical expander members as shown in the patent to Hood 2,410,785 patented November 5, 1946, difficulty has sometimes been encountered in securing a prompt and free release of the brake when the brake-applying pressure on the actuating means is released. One means for overcoming this difficulty is disclosed in the patent to Gleasman 2,530,764 issued November 21, 1950, in which springs are used to force apart the expander members when the compressive force for applying the member is released. This arrangement has been found to prevent that form of sticking of the brake parts which is caused by failure of the movable conical expander member to back away from the brake shoes when the pressure on the expander member is removed. It has been found, however, that in some cases the brake shoes themselves fail to become released from the anchor member, so that a sticking brake may still be encountered under some circumstances.

It is an object of the present invention to provide a shoe-type coaster brake incorporating novel means for preventing sticking of the brake shoes.

It is another object to provide such a device in which releasing forces are applied directly between the brake shoes and the expander members therefor.

Further objects and advantages will be apparent from the following description taken in connection with the accompanying drawing in which:

Fig. 1 is a side elevation, partly broken away and in section of a preferred embodiment of the invention; and Fig. 2 is a section taken substantially on the line 2—2 of Fig. 1.

In Fig. 1 of the drawing there is illustrated a fixed axle 1 on which is non-rotatably mounted an anchor member 2 which is prevented from rotation by means of an anchor arm 3 adapted to be attached to a frame member of the vehicle.

A control member 4 which is arranged to be actuated by the operator of the vehicle is journalled on the opposite end of the axle 1 as indicated at 5, and a wheel hub 6 having a generally cylindrical interior surface is rotatably mounted at its ends on the anchor member 2 and control member 4 as by means of bearings 7 and 8 respectively.

The control member 4 comprises a hollow screw shaft 9 on which is threaded a clutch nut member 11 having a clutch surface 12 adapted to engage a similar surface 13 in the interior of the hub 6 when the control member 4 is rotated by the operator in a forward direction as indicated by the arrow A.

Backward rotation of the control member causes the nut 11 to traverse into engagement with a conical expander member 14 slidably mounted on the axle 1 and slidably but non-rotatably connected to the anchor member 2 by means of rectangular keys 15 which are slidably received at their ends in mating recesses 16 and 17 in the expander member 14 and anchor member 2 respectively.

The anchor member 2 is provided with a tapered portion 18 facing the corresponding tapered portion 19 of the expander member 14, and semi-cylindrical brake shoes 21 and 22 having correspondingly flared interior surfaces at their ends are mounted on the expander member 14 and anchor member 2 in abutting relation with the keys 15 whereby movement of the expander member 14 to the right in Fig. 1 causes the brake shoes to be expanded into frictional engagement with the interior of the hub 6 while rotation of the shoes is prevented by their engagement with the keys 15.

According to the present invention means are provided for yieldably urging the brake shoes 21, 22 away from the tapered surfaces 18, 19 of the anchor member and expander member respectively, in order to prevent wedging or sticking of the brake shoes to the surfaces. As here shown this means is in the form of compression springs 23, 24 seated in recesses 25, 26 in the anchor member 2 and corresponding recesses 27, 28 in the brake shoes 21, 22 respectively, together with similar springs 29, 31 seated in recesses 32, 33 in the expander member 14, and recesses 34, 35 in the brake shoes 21, 22 respectively whereby the springs are effective to release the brake shoes from their wedging engagement with the tapered surfaces of the expander and anchor members.

In order to appreciate the utility and effectiveness of these releasing springs, it is necessary to examine the operative conditions and design limitations of the parts of the brake in the interest of economy and light weight. It is, of course, desirable to reduce the diameter of the brake hub as much as possible while retaining adequate braking capacity. This means that the brake shoes must be pressed against the interior of the hub with very high unit pressure in order to secure the desired braking effect at the small effective radius. These high pressures can be secured either by a low angle of taper of the expander surfaces 18, 19 or by a low pitch thread on the screw shaft 9. If the tapered surfaces have too low an included angle, however, the brake shoes will wedge immovably between these surfaces and the interior surface of the hub, causing sticking at this point, whereas if the pitch of the threads of the screw shaft 9 is made too low, the nut may stick on the screw shaft. The ultimate effect of the springs is, therefore, to permit the use of a small angle of taper of the expander surfaces without the danger of the brake shoes sticking to these surfaces, and consequently permitting the use of a sufficiently high pitch thread on the screw shaft 9 to eliminate the possibility of sticking of the nut on the screw shaft, while retaining the desired effectiveness of the brake as respects pressures applied to the control member 4 by the operator.

In the operation of the brake as herein disclosed, rotation of the control member 4 in a forward direction by the operator causes the clutch nut 11 to engage and drive the hub 6 through the clutch surfaces 12, 13. When movement of the control member 4 is stopped, the forward motion of the hub causes the nut 11 to overrun the screw shaft 9 until the nut is released from the hub, after which the hub can overrun freely. Backward movement of the control member 4 by the operator causes the screw shaft 9 to translate the nut 11 to the right in Fig. 1 until it engages the expander member 14, the adjacent surface of the nut and expander member being preferably provided with dentals 36, 37 to prevent relative rotation. The translation of the nut is preferably insured by a spring retarder 38 anchored to the expander member and bearing frictionally on the nut.

Further backward movement of the control member 4 causes the brake shoes 21 and 22 to be expanded into frictional engagement with the interior of the hub by the wedging action of the tapered surfaces 18, 19. Subsequent forward movement of the control member 4 by the operator relieves the pressure of the nut 11 on the expander member 14 whereupon the springs 23, 24 and 29, 31 expand and release the brake shoes from the expander and anchor members, thus once more permitting the hub to overrun freely.

Although but one form of the invention has been shown and described in detail, it will be understood that other forms are possible, and that changes may be made in the design and arrangement of the parts without departing from the spirit of the invention.

I claim:

In a coaster brake an axle, an anchor member non-rotatably mounted adjacent one end of the axle, a control member rotatably mounted on the axle adjacent the other end thereof, a hub rotatably mounted on the anchor member and control member, an expander member slidably mounted on the axle, means slidably but non-rotatably connecting the expander member to the anchor member, said expander and anchor members having inwardly tapering portions, cylindrical brake shoes having interior flared surfaces bearing on the tapered surfaces of the expander and anchor members, means actuated by the control member for moving the expander member toward the anchor member to expand the brake shoes into frictional contact with the interior of the hub, the tapered surfaces of the anchor member and brake members being formed with axially extending recesses which run out of the parts at one end, and terminate in a radial abutment at the other end; said recesses being arranged to register and thereby cooperate to form substantially cylindrical chambers, the ends of which are formed by said radial abutments; and cylindrical compression springs occupying said chambers and maintained under compression by said abutments.

WILLIAM J. CAMPBELL.

REFERENCES CITED

The following references are of record in the file of this patent:

UNITED STATES PATENTS

| Number | Name | Date |
|---|---|---|
| 882,159 | Morrow | Mar. 17, 1908 |
| 1,118,889 | Carter | Nov. 24, 1914 |
| 2,016,359 | Corbin, Jr. | Oct. 8, 1935 |
| 2,094,065 | Frank | Sept. 28, 1937 |
| 2,445,616 | Hood | July 20, 1948 |
| 2,530,764 | Gleasman | Nov. 21, 1950 |

FOREIGN PATENTS

| Number | Country | Date |
|---|---|---|
| 2,258 | Great Britain | Nov. 23, 1889 |